United States Patent
Ujihara et al.

(10) Patent No.: US 10,280,290 B2
(45) Date of Patent: May 7, 2019

(54) CELLULOS ESTER RESIN MODIFIER, CELLULOS ESTER RESIN COMPOSITION, OPTICAL FILM, METHOD FOR PRODUCING POLARIZING-PLATE PROTECTIVE FILM, AND LIQUID CRYSTAL DISPLAY DEVICE

(71) Applicant: DIC Corporation, Tokyo (JP)

(72) Inventors: Teppei Ujihara, Ichihara (JP); Miki Ota, Ichihara (JP); Hiroshi Yoshimura, Ichihara (JP); Yusuke Tajiri, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 15/526,837

(22) PCT Filed: Nov. 10, 2015

(86) PCT No.: PCT/JP2015/081573
§ 371 (c)(1),
(2) Date: May 15, 2017

(87) PCT Pub. No.: WO2016/088516
PCT Pub. Date: Jun. 9, 2016

(65) Prior Publication Data
US 2017/0321041 A1 Nov. 9, 2017

(30) Foreign Application Priority Data

Dec. 3, 2014 (JP) .................. 2014-244894

(51) Int. Cl.
| | |
|---|---|
| *C08L 1/10* | (2006.01) |
| *C08K 5/10* | (2006.01) |
| *C08L 67/02* | (2006.01) |
| *G02B 1/18* | (2015.01) |
| *C08J 5/18* | (2006.01) |
| *G02B 27/00* | (2006.01) |
| *G02F 1/1335* | (2006.01) |

(52) U.S. Cl.
CPC . *C08L 1/10* (2013.01); *C08J 5/18* (2013.01); *C08K 5/10* (2013.01); *C08L 67/02* (2013.01); *G02B 1/18* (2015.01); *G02B 27/0006* (2013.01); *C08J 2301/10* (2013.01); *C08J 2467/02* (2013.01); *G02F 1/133528* (2013.01)

(58) Field of Classification Search
None
See application file for complete search history.

(56) References Cited

U.S. PATENT DOCUMENTS

| | | | | |
|---|---|---|---|---|
| 2005/0250907 | A1* | 11/2005 | Nakayama | B01F 17/005 525/191 |
| 2008/0246189 | A1* | 10/2008 | Kuzuhara et al. | |
| 2011/0001904 | A1* | 1/2011 | Tachikawa | C08B 3/06 349/96 |
| 2011/0033640 | A1* | 2/2011 | Yamada | B29C 47/0021 428/1.1 |
| 2015/0323824 | A1* | 11/2015 | Hisakado | C08J 5/18 428/1.31 |

FOREIGN PATENT DOCUMENTS

JP     2006-282987 A    10/2006

OTHER PUBLICATIONS

International Search Report dated Feb. 16, 2016, issued for PCT/JP2015/081573.

* cited by examiner

*Primary Examiner* — Melvin C. Mayes
*Assistant Examiner* — Colette B Nguyen
(74) *Attorney, Agent, or Firm* — Locke Lord LLP

(57) ABSTRACT

A cellulosic ester resin modifier for producing a cellulosic ester film, which facilitates obtaining a film that remains transparent even when exposed to high-humidity and high-temperature environments, and with which it is possible to obtain a film having excellent water vapor permeability resistance, and dimensional stability against heat. The present invention also provides a cellulosic ester resin composition using the modifier, a method for producing a polarizing-plate protective film, and a liquid crystal display device, and provides a cellulosic ester resin modifier including a polyester polyol (A) having a phthalic acid residue and an aliphatic glycol residue having 2 to 3 carbon atoms in a main chain skeleton and a diester (B) having an aliphatic glycol having 2 to 3 carbon atoms and an aromatic monocarboxylic acid, in which a mass ratio of [(A)/(B)] is in a range of 90/10 to 60/40.

18 Claims, No Drawings

CELLULOS ESTER RESIN MODIFIER, CELLULOS ESTER RESIN COMPOSITION, OPTICAL FILM, METHOD FOR PRODUCING POLARIZING-PLATE PROTECTIVE FILM, AND LIQUID CRYSTAL DISPLAY DEVICE

TECHNICAL FIELD

The present invention relates to a cellulosic ester resin modifier which is less likely to contaminate the production line when producing a cellulosic ester film, which is less likely to cause turbidity in the film even when exposed to high-humidity and high-temperature environments, and which is capable of providing a film having excellent water vapor permeability resistance and dimensional stability against heat, a cellulosic ester resin composition using the cellulosic ester resin modifier, a method for producing a polarizing-plate protective film, and a liquid crystal display device.

BACKGROUND ART

Since a cellulosic ester resin (CA) film has transparency, optical isotropy, toughness, and favorable adhesiveness to polyvinyl alcohol (hereinafter abbreviated as "PVA") which is a material for a polarizer for a liquid crystal display device, the CA film has been used as a polarizer-protecting film which constitutes a polarizing-plate for a liquid crystal display device such as a television or a laptop computer.

These polarizer protective films are required to have various properties, specifically, transparency, water vapor permeability resistance, dimensional stability against heat, and the like and, in recent years, there has been a demand for polarizer protective films which are excellent in these various physical properties. In addition, in recent years, liquid crystal display devices have been made thinner and polarizer protective films have also been thinned accordingly, and there is also a demand for the polarizer protective films to realize the above properties at a level of the related art or exceeding the level with a thinner film thickness.

In order to develop the various properties described above, for example, various modifiers such as triphenyl phosphate and ester compounds are added to cellulosic ester resins to produce cellulosic ester films. Then, in addition to developing the various properties described above, there is also a demand for the modifier to have a property (a volatilization-resistant property) of being less likely to cause contamination of the production line due to volatilization at the time of cellulosic ester film production.

For example, a polyester obtained by blocking the terminal hydroxyl group of a polyester polyol obtained using phthalic acid and propylene glycol with benzoic acid or paratoluic acid is known as a modifier which is able to provide a film excellent in water vapor permeability resistance and less likely causes contamination of the production line due to volatilization at the time of production (refer to, for example, PTL 1). However, there are problems in that the polyester disclosed in PTL 1 has insufficient compatibility with the cellulosic ester resin and the film becomes opaque when exposed to high-humidity and high-temperature environments.

CITATION LIST

Patent Literature

[PTL 1] JP-A-2006-282987

SUMMARY OF INVENTION

Technical Problem

An object of the present invention is to provide a cellulosic ester resin modifier which is less likely to contaminate the production line when producing a cellulosic ester film, which facilitates obtaining a film that remains transparent even when exposed to high-humidity and high-temperature environments, and with which it is possible for the obtained film to have excellent water vapor permeability resistance, and dimensional stability against heat. In addition, the present invention also provides a cellulosic ester resin composition containing the modifier, an optical film formed of the resin composition, and a method for producing a polarizing-plate protective film which is a particularly preferable application of the cellulosic ester resin modifier of the present invention among the optical films, and a liquid crystal display device using the optical film.

Solution to Problem

As a result of intensive research, the present inventors found that, by mixing a polyester polyol, which has a skeleton derived from phthalic acid and a skeleton derived from a glycol having 2 to 3 carbon atoms, and a diester, which has an aliphatic glycol having 2 to 3 carbon atoms and an aromatic monocarboxylic acid, with a cellulosic ester resin such that the ratio of the polyester polyol is excessive, a film which is less likely to contaminate the production line at the time of cellulosic ester film production and which remains transparent even when exposed to high-humidity and high-temperature environments is easily obtained, and that the obtained film is excellent in water vapor permeability resistance, and dimensional stability against heat, and is able to be suitably used for optical applications, in particular, for liquid crystal display devices, thereby completing the present invention.

That is, the present invention provides a cellulosic ester resin modifier including a polyester polyol (A), which has a phthalic acid residue and an aliphatic glycol residue having 2 to 3 carbon atoms in the main chain skeleton, and a diester (B), which has an aliphatic glycol having 2 to 3 carbon atoms and an aromatic monocarboxylic acid, in which a mass ratio of [(A)/(B)] is in a range of 90/10 to 60/40.

In addition, the present invention also provides a cellulosic ester resin composition including the cellulosic ester resin modifier and a cellulosic ester resin.

Furthermore, the present invention provides an optical film including the cellulosic ester resin composition.

Furthermore, the present invention provides a method for producing a polarizing-plate protective film, the method including casting a resin solution obtained by dissolving the cellulosic ester resin modifier and a cellulosic ester resin in an organic solvent on a metal support, and then evaporating and removing the organic solvent to perform drying, thereby obtaining a polarizing-plate protective film.

Furthermore, the present invention provides a liquid crystal display device having the optical film.

Advantageous Effects of Invention

According to the present invention, it is possible to provide a cellulosic ester resin modifier which easily provides a film which remains transparent even when exposed to high-humidity and high-temperature environments and which is able to provide the film which is excellent in water vapor permeability resistance and dimensional stability against heat. In addition, according to the present invention, it is possible to suitably use the optical film using the cellulosic ester resin modifier as a protective film (polarizing-plate protective film) for protecting a polarizer of a polarizing-plate for a liquid crystal display device. Furthermore, since the cellulosic ester resin modifier of the present invention has high volatilization resistance, there is little contamination of the film production line by volatilization even at high temperatures, thus it is possible to reduce the number of performing maintenance thereby improving production efficiency.

In addition, according to the present invention, it is possible to produce a film using a method (solution casting method) of casting a resin solution obtained by dissolving the cellulosic ester resin modifier and a cellulosic ester resin in an organic solvent on a metal support, and then evaporating and removing the organic solvent to perform drying, or a method (melt extrusion method) of melt-kneading a composition including the cellulosic ester resin modifier and a cellulosic ester resin by means of an extruder or the like and forming the resultant into a film through a T-die or the like. Furthermore, it is also possible to produce a stretched film by stretching the film obtained by the solution casting method or the melt extrusion method. It is possible to produce various optical films such as a polarizing-plate protective film, an optical compensation film, and a phase difference film according to the methods described above.

DESCRIPTION OF EMBODIMENTS

The cellulosic ester resin modifier of the present invention includes a polyester polyol (A), which has a phthalic acid residue and an aliphatic glycol residue having 2 to 3 carbon atoms in the main chain skeleton, and a diester (B), which has an aliphatic glycol having 2 to 3 carbon atoms and an aromatic monocarboxylic acid, in which a mass ratio of [(A)/(B)] is in a range of 90/10 to 60/40. A case where the polyester polyol (A) is contained so as to exceed a ratio of 90/10 in terms of mass ratio [(A)/(B)] is not preferable because the water vapor permeability resistance of the obtained film is remarkably deteriorated. In addition, a case where the polyester polyol (A) is contained at less than a ratio of 60/40 in terms of the mass ratio [(A)/(B)] is not preferable since a cellulosic ester resin modifier which is less likely to contaminate a production line at the time of cellulosic ester film production is not easily obtained. The cellulosic ester resin modifier of the present invention containing the polyester polyol (A) and the diester (B) in a mass ratio [(A)/(B)] in a range of 80/20 to 65/35 makes it possible to obtain a film with favorable water vapor permeability resistance and dimensional stability and moreover the cellulosic ester resin modifier is less likely to contaminate a production line, which is more preferable.

The polyester polyol (A) used in the present invention has a phthalic acid residue in the main chain skeleton as described above. The polyester polyol (A) may have a polyvalent carboxylic acid residue other than phthalic acid as long as the effect of the present invention is not impaired. Examples of the polyvalent carboxylic acid residue other than phthalic acid include the following polyvalent carboxylic acid residues. Here, "phthalic acid residue" in the present invention is an ortho-phthalic acid residue.

Specifically, examples of the residue of the aromatic dicarboxylic acid other than phthalic acid include isophthalic acid, terephthalic acid, 1,4-naphthalenedicarboxylic acid, 2,3-naphthalenedicarboxylic acid, 2,6-naphthalenedicarboxylic acid, 2,7-naphthalenedicarboxylic acid, 1,8-naphthalenedicarboxylic acid, and the like, and esterified products and acid chloride residues thereof.

Specific examples of the residue of the aliphatic dicarboxylic acids include residues such as succinic acid, dimethyl succinate, glutaric acid, dimethyl glutarate, adipic acid, dimethyl adipate, diethyl adipate, dibutyl adipate, pimelic acid, dimethyl pimelate, suberic acid, dimethyl suberate, azelaic acid, dimethyl azelate, sebacic acid, dimethyl sebacate, decanedicarboxylic acid, dimethyl decane dicarboxylate, cyclohexane dicarboxylate, dimethyl cyclohexane dicarboxylate, dimer acid, dimethyl dimerate, fumaric acid, and dimethyl fumarate.

In a case where the polyester polyol (A) used in the present invention has a polyvalent carboxylic acid residue other than a phthalic acid residue in the main chain skeleton, the residue is preferably a residue of an aliphatic dicarboxylic acid having 2 to 4 carbon atoms and, among these, an adipic acid residue or a succinic acid residue is more preferable.

In the present invention, the "phthalic acid residue" represents an organic group obtained by removing hydroxyl groups contained in carboxyl groups from phthalic acid. In addition, "residue of a polyvalent carboxylic acid other than phthalic acid" means an organic group obtained by removing hydroxyl groups contained in carboxyl groups from the aromatic dicarboxylic acid.

In a case where the polyester polyol (A) used in the present invention has a polyvalent carboxylic acid residue other than the phthalic acid residue in the main chain skeleton, the usage amount of polyvalent carboxylic acid other than phthalic acid as a raw material is preferably 5% to 40% by mass with respect to the total amount of the polyvalent carboxylic acid, and more preferably 10% to 30% by mass. That is, in a case where the polyester polyol (A) used in the present invention has a polyvalent carboxylic acid residue other than the phthalic acid residue in the main chain skeleton, the amount of the residue is preferably 5% to 40% by mass with respect to the total amount of the polyvalent carboxylic acid residue, and more preferably 10% to 30% by mass.

The polyester polyol (A) used in the present invention has an aliphatic glycol residue having 2 to 3 carbon atoms in the main chain skeleton as described above. Preferable examples of the aliphatic glycol residue having 2 to 3 carbon atoms include an ethylene glycol residue or a propylene glycol residue. Having these residues makes it possible to expect a modifier having favorable compatibility with the cellulosic ester resin.

The content of aliphatic glycol residues having 2 to 3 carbon atoms in the residues derived from the glycol of the polyester polyol (A) of the present invention is preferably 100% by mass; however, a glycol residue other than the aliphatic glycol residue having 2 to 3 carbon atoms may be contained within a range not impairing the effect of the present invention. Examples of the glycol residue include residues of 2-methylpropanediol, 1,2-butanediol, 1,3-butanediol, 1,4-butanediol, 2,3-butanediol, 1,5-pentanediol, neopentyl glycol, 1,6-hexanediol, 3-methyl-1,5-pentanediol, 1,2-cyclopentanediol, 1,3-cyclopentanediol, and the like.

In the present invention, the "residue of an aliphatic glycol having 2 to 3 carbon atoms" represents an organic group obtained by removing hydrogen atoms contained in hydroxyl groups from the aliphatic glycol. In addition, the "glycol residue other than the aliphatic glycol residue having 2 to carbon atoms" represents an organic group obtained by removing hydrogen atoms contained in the hydroxyl groups of the glycol.

In the case where the polyester polyol (A) used in the present invention has a glycol residue other than the aliphatic glycol residue having 2 to 3 carbon atoms in the main chain skeleton, the usage amount of the glycol other than the aliphatic glycol residue having 2 to 3 carbon atoms as a raw material is preferably 1% to 40% by mass and more preferably 1% to 30% by mass, with respect to the total amount of glycol.

Examples of the polyester polyol (A) used in the present invention include a polyester polyol represented by the following structural formula (1).

[Chem. 1]

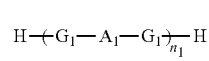
(1)

In the formula, $G_1$ represents an aliphatic glycol residue having 2 to 3 carbon atoms, $A_1$ represents a phthalic acid residue, and $n_1$ represents a repeating unit and is 1 to 10.

Among the polyester polyols (A) used in the present invention, examples of a polyester polyol having a phthalic acid residue, a residue of a polyvalent carboxylic acid other than phthalic acid, and an aliphatic glycol residue having 2 to 3 carbon atoms include a polyester polyol represented by the following structural formula (2).

[Chem. 2]

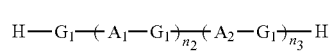
(2)

In the formula, $G_1$ represents an aliphatic glycol residue having 2 to 3 carbon atoms. $A_1$ represents a phthalic acid residue. $A_2$ represents a residue of a polyvalent carboxylic acid other than phthalic acid. $n_2$ and $n_3$ each represent a repeating unit, and the sum of $n_2$ and $n_3$ is 1 to 10.

In the structural formula (2), the structure in the repeating unit $n_2$ and the structure in the repeating unit $n_3$ may each be present in block form or randomly.

Among the polyester polyols (A) used in the present invention, examples of a polyester polyol having a phthalic acid residue, an aliphatic glycol residue having 2 to 3 carbon atoms, and a glycol residue other than the aliphatic glycol residue having 2 to 3 carbon atoms include the polyester polyol represented by the following structural formula (3) or structural formula (4).

[Chem. 3]

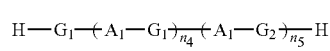
(3)

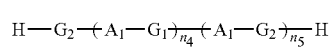
(4)

In the formula, $G_1$ represents an aliphatic glycol residue having 2 to 3 carbon atoms. $G_2$ represents a glycol residue other than an aliphatic glycol residue having 2 to 3 carbon atoms. $A_1$ represents a phthalic acid residue. $n_4$ and $n_5$ each represent a repeating unit, and the sum of $n_4$ and $n_5$ is 1 to 10.

In the structural formula (2) and the structural formula (4), the structure in the repeating unit $n_4$ and the structure in the repeating unit $n_5$ may each be present in block form or randomly.

Among the polyester polyols (A) used in the present invention, examples of the polyester polyol having a phthalic acid residue, a residue of a polyvalent carboxylic acid other than phthalic acid, an aliphatic glycol residue having 2 to 3 carbon atoms, and a glycol residue other than the aliphatic glycol residue having 2 to 3 carbon atoms include polyester polyols represented by the following structural formula (5) and structural formula (6).

[Chem. 4]

(5)

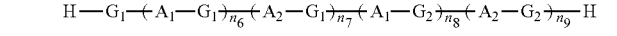
(6)

In the formula, $G_1$ represents an aliphatic glycol residue having 2 to 3 carbon atoms. $G_2$ represents a glycol residue other than an aliphatic glycol residue having 2 to 3 carbon atoms. $A_1$ represents a phthalic acid residue. $A_2$ represents a residue of a polyvalent carboxylic acid other than phthalic acid. $n_6$, $n_7$, $n_8$, and $n_9$ each represent a repeating unit, and the sum of $n_6$, $n_7$, $n_8$, and $n_9$ is 1 to 10.

It is possible to obtain the polyester polyol (A) used in the present invention by a method described below. The obtained polyester polyol is usually in the state of a mixture in which polyester polyols of various molecular weights are present. That is, each of the polyester polyols represented by the structural formulas (1) to (6) exemplified above is a mixture of polyester polyols having various repeating numbers. Accordingly, the sum of the repeating numbers ($n_1$, $n_2+n_2+n_3$, $n_4+n_5$, $n_6+n_7+n_8+n_9$) of the polyester polyols represented by the structural formulas (1) to (6) is the "total of the average" in the "mixture state".

It is possible to obtain the polyester polyol (A) used in the present invention, for example, by reacting a dicarboxylic acid which imparts the structure of a phthalic acid residue in the main chain skeleton to the polyester, another dicarboxylic acid as necessary, a divalent alcohol which imparts the structure of an aliphatic glycol residue having 2 to 3 carbon atoms to the polyester, and another divalent alcohol as necessary, at a ratio such that an alcoholic hydroxyl group derived from alcohol remains at the end.

Examples of the dicarboxylic acid which imparts the structure of the phthalic acid residue to the polyester in the main chain skeleton include phthalic anhydride, orthophthalic acid, dimethyl phthalate, and the like.

Examples of the other dicarboxylic acids include succinic acid, dimethyl succinate, glutaric acid, dimethyl glutarate, adipic acid, dimethyl adipate, diethyl adipate, dibutyl adipate, pimelic acid, dimethylpimelate, suberic acid, dimethyl suberate, azelaic acid, dimethyl azelate, sebacic acid, dimethyl sebacate, decanedicarboxylic acid, dimethyl decane dicarboxylate, cyclohexane dicarboxylate, dimethyl cyclohexane dicarboxylate, dimer acid, dimethyl dimerate, fumaric acid, dimethyl fumarate, and the like.

Examples of the divalent alcohol which imparts the structure of the aliphatic glycol residue having 2 to 3 carbon atoms to the polyester include ethylene glycol, propylene glycol, and the like.

Examples of the other divalent alcohols include 2-methylpropanediol, 1,2-butanediol, 1,3-butanediol, 1,4-butanediol, 2,3-butanediol, 1,5-pentanediol, neopentyl glycol, 1,6-hexanediol, 3-methyl-1,5-pentanediol, 1,2-cyclopentanediol, 1,3-cyclopentanediol, and the like.

It is possible to produce the polyester polyol (A), for example, by subjecting the raw material to an esterification reaction in the presence of an esterification catalyst as necessary, for example, in a temperature range of 180 to 250° C. for 10 to 25 hours. Here, conditions such as the temperature and time of the esterification reaction are not particularly limited and may be set as appropriate.

Examples of the esterification catalyst include titanium-based catalysts such as tetraisopropyl titanate and tetrabutyl titanate; tin-based catalysts such as dibutyltin oxide; organic sulfonic acid-based catalysts such as p-toluenesulfonic acid; and the like.

The usage amount of the esterification catalyst may be set as appropriate, but the esterification catalyst is usually preferably used in a range of 0.001 to 0.1 parts by mass with respect to 100 parts by mass of the total amount of the raw material.

The number average molecular weight (Mn) of the polyester polyol (A) is preferably in the range of 500 to 1,500, and more preferably in the range of 600 to 1,200, since the compatibility with the cellulosic ester resin is favorable.

Here, the number average molecular weight (Mn) is a value in terms of polystyrene conversion based on gel permeation chromatography (GPC) measurement. Here, the GPC measurement conditions are as follows.

[GPC Measurement Conditions]

Measuring apparatus: High-speed GPC apparatus "HLC-8320 GPC" manufactured by Tosoh Corporation
Column: "TSK GURDCOLUMN SuperHZ-L" manufactured by Tosoh Corporation+"TSK gel SuperHZM-M" manufactured by Tosoh Corporation+"TSK gel SuperHZM-M" manufactured by Tosoh Corporation+"TSK gel SuperHZ-2000" manufactured by Tosoh Corporation+"TSK gel SuperHZ-2000" manufactured by Tosoh Corporation
Detector: Refractive Index Detector (RI)
Data processing: "EcoSEC Data Analysis version 1.07" manufactured by Tosoh Corporation
Column temperature: 40° C.
Development solvent: tetrahydrofuran
Flow rate: 0.35 mL/min
Measurement sample: 15 mg of the sample was dissolved in 10 ml of tetrahydrofuran, and the obtained solution was filtrated with a microfilter to obtain a measurement sample.
Sample injection amount: 20 μl
Standard sample: A monodisperse polystyrene described below with a known molecular weight was used in accordance with the "HLC-8320 GPC" measurement manual.
(Monodisperse Polystyrene)
"A-300" manufactured by Tosoh Corporation
"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation
"F-40" manufactured by Tosoh Corporation
"F-80" manufactured by Tosoh Corporation
"F-128" manufactured by Tosoh Corporation
"F-288" manufactured by Tosoh Corporation The properties of the polyester polyol (A) vary depending on the number average molecular weight (Mn), the composition, and the like, but the polyester polyol (A) is usually liquid, solid, paste, or the like at normal temperature.

The acid value of the polyester polyol (A) is preferably 3 or less and more preferably 1 or less since this imparts excellent hydrolysis resistance to the film and it is possible to maintain the stability of the cellulosic ester resin modifier itself. In addition, the hydroxyl value is preferably in the range of 75 to 225, and more preferably in the range of 90 to 190.

The diester (B) used in the present invention is a diester of an aliphatic glycol having 2 to 3 carbon atoms and an aromatic monocarboxylic acid as described above. Preferable examples of an aliphatic glycol having 2 to 3 carbon atoms include ethylene glycol and propylene glycol. The diester (B) has a residue of an aliphatic glycol having 2 to 3 carbon atoms and a residue of an aromatic monocarboxylic acid. In the present invention, the "aromatic monocarboxylic acid residue" represents an organic group obtained by removing a hydroxyl group contained in a carboxyl group from an aromatic monocarboxylic acid.

Preferable examples of the aromatic monocarboxylic acid include benzoic acid or a derivative thereof. Examples of the derivatives of benzoic acid include dimethylbenzoic acid, trimethylbenzoic acid, tetramethylbenzoic acid, ethylbenzoic acid, propylbenzoic acid, butylbenzoic acid, cuminic acid, para-tertiary butylbenzoic acid, ortho-toluic acid, meta-toluic acid, para-toluic acid, ethoxybenzoic acid, propoxybenzoic acid, methoxybenzoic acid, dimethoxybenzoic acid, trimethoxybenzoic acid, cyanobenzoic acid, hydroxybenzoic acid, cinnamic acid, and the like. It is also possible to use these aromatic monocarboxylic acids (b3) or alkyl ester compounds thereof alone or in a combination of two or more types. Among these, para-toluic acid and benzoic acid are preferable due to being excellent in compatibility with the cellulosic ester resin.

It is possible to obtain the diester (B) used in the present invention, for example, by reacting the aliphatic glycol having 2 to 3 carbon atoms with an aromatic monocarboxylic acid. As the reaction conditions (catalyst, temperature, time, and the like), for example, it is possible to use the conditions used in the synthesis of the polyester polyol (A) used in the present invention.

The cellulosic ester resin modifier of the present invention contains the polyester polyol (A) and the diester (B) in amass ratio [(A)/(B)] of 90/10 to 60/40. The cellulosic ester resin modifier of the present invention may be a modifier formed of only the polyester polyol (A) and the diester (B), or may include a polyester other than the polyester resin (A) or a diester other than the diester (B). In addition, a modifier other than the polyester (A) and the diester (B) may be included, or unreacted raw materials used for producing the polyester resin (A) or the diester (B) may be included.

It is possible to mix the modifier of the present invention with a cellulosic ester resin to obtain a cellulosic ester resin composition. Using this composition makes it possible to obtain a film which is transparent and excellent in water vapor permeability resistance and dimensional stability against heat, without contamination of the production line.

Examples of the cellulosic ester resin include resins obtained by esterifying part or all of the hydroxyl groups of a cellulose obtained from cotton linter, wood pulp, kenaf, or the like and, among these, a film obtained using a cellulosic ester resin obtained by esterizing cellulose obtained from cotton linter is preferable since it is easy to peel off from the metal support forming the film producing apparatus and the production efficiency of the film is able to be further improved.

Examples of the cellulosic ester resin include cellulosic acetates such as cellulosic acetate, cellulosic acetate propionate, cellulosic acetate butyrate, and cellulosic acetate phthalate; cellulosic nitrates, and the like. In a case where the cellulosic ester optical film is used as a polarizing-plate protective film, it is preferable to use cellulosic acetate since it is possible to obtain a film excellent in mechanical properties and transparency.

Examples of the cellulosic acetate include cellulosic triacetate, cellulosic diacetate, and the like.

The number average molecular weight (Mn) of the cellulosic acetate is preferably in the range of 70,000 to 300,000, and more preferably in the range of 80,000 to 200,000. If the (Mn) of the cellulosic acetate is within such a range, it is possible to obtain a film having excellent mechanical properties.

The amount of the cellulosic ester resin modifier of the present invention in the cellulosic ester resin composition is preferably in the range of 5 to 30 parts by mass with respect to 100 parts by mass of the cellulosic ester resin, and more preferably in the range of 5 to 15 parts by mass. If the cellulosic ester resin modifier is used in such a range, the composition becomes a composition which is able to provide a film which is excellent in water vapor permeability resistance, which is excellent in transparency, and which is suitably used for optical applications.

Next, description will be given of a cellulosic ester film containing a cellulosic ester resin and the cellulosic ester resin modifier of the present invention.

The cellulosic ester film is a film containing the cellulosic ester resin, the cellulosic ester resin modifier, other various additives as necessary, and the like and, in particular, is able to be preferably used as a cellulosic ester film (optical film) for optical applications. The film thickness of the optical film of the present invention varies depending on the application to be used, but is generally preferably in the range of 10 to 200 µm.

Here, it is also possible to obtain the optical film of the present invention by using a cellulosic ester resin composition including the cellulosic ester resin and the cellulosic ester resin modifier.

The optical film may have properties such as optical anisotropy or optical isotropy, but in a case where the optical film is used for a polarizing-plate protective film application, it is preferable to use an optically isotropic optical film which does not inhibit the transmission of light.

It is possible to use the optical film for various purposes. The most effective application is, for example, a polarizing-plate protective film requiring optical isotropy of a liquid crystal display device, but use is also possible as a support of a polarizing-plate protective film requiring an optical compensation function.

It is possible to use the optical film of the present invention in liquid crystal cells of various display modes. Examples of the display modes include In-Plane Switching (IPS), Twisted Nematic (TN), Vertically Aligned (VA), Optically Compensatory Bend (OCB), and the like.

The amount of the cellulosic ester resin modifier of the present invention contained in the optical film of the present invention is preferably in the range of 5 to 30 parts by mass with respect to 100 parts by mass of the cellulosic ester resin, and more preferably 5 to 15 parts by mass. Using the cellulosic ester resin modifier within such a range makes it possible to obtain a film excellent in water vapor permeability resistance and in transparency and suitable for optical applications.

It is possible to produce the optical film, for example, by a melt extrusion method. Specifically, it is possible to obtain the cellulosic ester resin composition containing the cellulosic ester resin, the cellulosic ester resin modifier, other various additives as necessary, and the like by melt-kneading the composition with an extruder or the like and forming the composition into a film using a T die or the like. In addition, it is also possible to use the cellulosic ester resin composition instead of the cellulosic ester resin and the cellulosic ester resin modifier.

In addition, in addition to the above forming method, it is possible to obtain the cellulosic ester optical film by, for example, forming the film using a so-called solution casting method (solvent casting method) in which a resin solution obtained by dissolving the cellulosic ester resin and the cellulosic ester resin modifier in an organic solvent is cast on a metal support and then evaporating and removing the organic solvent to perform drying.

According to the solution casting method, it is possible to obtain a film which is unlikely to have unevenness on the surface thereof and which is excellent in surface smoothness. Therefore, it is possible to favorably use the film obtained by the solution casting method for optical applications and, in particular, it is possible to preferably use the film for a polarizing-plate protective film application.

The solution casting method generally includes a first step of dissolving the cellulosic ester resin and the cellulosic ester resin modifier in an organic solvent and casting the obtained resin solution on a metal support, a second step of evaporating and removing the organic solvent included in the cast resin solution to perform drying, thereby forming a film, and then a third step of peeling the film formed on the metal support from the metal support, followed by heating to perform drying.

Examples of the metal support used in the first step include a support made of metal in an endless belt shape or a drum-shape and, for example, it is possible to use a support made of stainless steel with the surface thereof subjected to mirror finishing.

When the resin solution is cast on the metal support, it is preferable to use a resin solution filtered with a filter in order to prevent foreign matter from mixing into the film to be obtained.

The drying method in the second step is not particularly limited and examples thereof include a method for blowing air having a temperature range of 30 to 50° C. on the upper surface and/or the lower surface of the metal support to evaporate 50% to 80% by mass of the organic solvent included in the cast resin solution and form a film on the metal support.

The third step is a step of peeling the film formed in the second step from the metal support and heating and drying the film under temperature conditions higher than those in the second step. As the heating and drying method, for example, a method for gradually increasing the temperature under a temperature condition of 100 to 160° C. is preferable, since it is possible to obtain favorable dimensional stability. Heating and drying under the above temperature conditions makes it possible to almost completely remove the organic solvent remaining in the film after the second step.

In the first step to the third step, it is possible to recover and reuse the organic solvent.

The organic solvent which is able to be used in mixing and dissolving the cellulosic ester resin and the cellulosic ester resin modifier in an organic solvent is not particularly limited as long as it is capable of dissolving the cellulosic ester resin and the cellulosic ester resin modifier; however, in a case where cellulosic acetate is used as the cellulosic ester, it is preferable to use an organic halogen compound such as methylene chloride or dioxolanes as a favorable solvent.

In addition, it is preferable to use a poor solvent such as, for example, methanol, ethanol, 2-propanol, n-butanol, cyclohexane, or cyclohexanone in combination with the favorable solvent in order to improve the production efficiency of the film.

The mixing ratio of the favorable solvent and the poor solvent is preferably in the range of favorable/poor solvent=75/25 to 95/5 by mass ratio.

The concentration of the cellulosic ester resin in the resin solution is preferably 10% to 50% by mass, and more preferably 15% to 35% by mass.

In the solution casting method, it is possible to provide a fourth step of heating and stretching the film after obtaining the film heated and dried in the third step.

In the fourth step, after film formation using the cellulosic ester resin composition of the present invention through the first step to the third step, the obtained film is heated and stretched. The stretching operation may be carried out in multiple stages or biaxially stretching in the casting direction and width direction. In addition, in the case of performing biaxial stretching, simultaneous biaxial stretching may be carried out or stepwise biaxial stretching may be carried out. In this case, stepwise means that, for example, it is possible to sequentially perform stretching in different stretching directions, or it is also possible to divide stretching in the same direction into multiple stages and to add stretching in different directions to either step.

In addition, simultaneous biaxial stretching includes the case of stretching in one direction and relaxing tension to contract in the other direction. A preferable stretching magnification of simultaneous biaxial stretching is, for example, 1.05 to 1.5 times in the width direction, and 0.8 to 1.3 times in the longitudinal direction (casting direction), and more preferably 1.1 to 2.5 times in the width direction and 0.8 to 0.99 times in the longitudinal direction. A particularly preferable stretching magnification is 1.1 to 2.0 times in the width direction, and is 0.9 to 0.99 times in the longitudinal direction.

It is possible to use various additives in the optical film of the present invention in a range which does not impair the object of the present invention.

Examples of the additives include other modifiers other than the cellulosic ester resin modifier of the present invention, a thermoplastic resin, an ultraviolet absorber, a matting agent, a deterioration inhibitor (for example, an antioxidant, a peroxide decomposing agent, a radical inhibitor, a metal deactivator, an acid collecting agent, and the like), a dye and the like. It is possible to use these additives together when dissolving and mixing the cellulosic ester resin and the cellulosic ester resin modifier in the organic solvent, or these additives may be separately added and used, without being particularly limited.

Examples of other modifiers other than the cellulosic ester resin modifier include phosphate esters such as triphenyl phosphate (TPP), tricresyl phosphate, and cresyl diphenyl phosphate, phthalic acid esters such as dimethyl phthalate, diethyl phthalate, dibutyl phthalate, and di-2-ethylhexyl phthalate, ethyl phthalyl ethyl glycolate, butyl phthalyl butyl glycolate, trimethylol propane tribenzoate, pentaerythritol tetraacetate, tributyl acetyl citrate, and the like.

The thermoplastic resin is not particularly limited, but examples thereof include a polyester resin, a polyester ether resin, a polyurethane resin, an epoxy resin, a toluenesulfonamide resin, and the like other than the cellulosic ester resin modifier of the present invention.

The ultraviolet absorber is not particularly limited, but examples thereof include an oxybenzophenone-based compound, a benzotriazole-based compound, a salicylate ester-based compound, a benzophenone compound, a cyanoacrylate-based compound, a nickel complex salt-based compound, and the like. The amount of the ultraviolet absorber is preferably in the range of 0.01 to 2 parts by mass with respect to 100 parts by mass of the cellulosic ester resin.

Examples of the matting agent include silicon oxide, titanium oxide, aluminum oxide, calcium carbonate, calcium silicate, aluminum silicate, magnesium silicate, calcium phosphate, kaolin, talc, and the like. The amount of the matting agent is preferably in the range of 0.1 to 0.3 parts by mass with respect to 100 parts by mass of the cellulosic ester resin.

The type and blending amount of the dye are not particularly limited within a range which does not impair the object of the present invention.

The film thickness of the optical film is preferably in the range of 10 to 200 μm, more preferably in the range of 15 to 120 μm, and particularly preferably in the range of 15 to 80 μm. In the case where the optical film is used as a polarizing-plate protective film, the optical film is suitable for thinning a liquid crystal display device as long as the film thickness is in the range of 15 to 80 μm, and it is possible to maintain excellent performance such as a sufficient film strength, Rth stability, and water vapor permeability resistance.

In a case where the film thickness of the optical film and the polarizing-plate protective film of the present invention is 60 μm, the water vapor permeability of the film formed only of cellulosic ester resin varies depending on the type of cellulosic ester resin, but is approximately 950 to 1,300 $g/m^2/24$ h. When the optical film formed of the cellulosic ester resin composition of the present invention to which the cellulosic ester resin modifier of the present invention is added has a water vapor permeability of 900 $g/m^2/24$ h or less, it is preferable since it is possible to suppress the adverse effect of water vapor when formed as a polarizing-plate, and it is more preferable that the water vapor permeability be in the range of 100 to 800 $g/m^2/24$ h.

The optical film and the polarizing-plate protective film of the present invention are resistant to film turbidity even when exposed to high-humidity and high-temperature environments and the films obtained are excellent in water vapor permeability resistance, dimensional stability against heat, and transparency, thus, it is possible to use the film in an optical film for a liquid crystal display device, a support of silver halide photo-sensitive material, or the like. The optical film is not particularly limited, but examples thereof include a polarizing-plate protective film, a retardation film, a reflecting plate, a viewing angle improving film, an antiglare film, a non-reflective film, an antistatic film, a color filter, and the like.

Examples of the liquid crystal display device of the present invention include a liquid crystal display device provided with a polarizing-plate for a liquid crystal display device using the polarizing-plate protective film of the present invention. Specifically, the polarizing-plate for a liquid crystal display device has a structure in which the optical film of the present invention is used by being attached as a polarizing-plate protective film on one side or both sides of a polarizer in which dichroic molecules such as iodine compounds are oriented in a polyvinyl alcohol (PVA) film. Here, the polarizing-plate for a liquid crystal display device is arranged on both sides of the liquid crystal cell in a crossed Nicols state.

EXAMPLES

More specific description will be given of the present invention based on examples. Parts and percentages in the examples are on a mass basis unless otherwise specified.

Synthesis Example 1 [Synthesis of Polyester Polyol (A)]

310 g of adipic acid (hereinafter abbreviated as "AA"), 944 g of phthalic anhydride (hereinafter abbreviated as "PA"), 922 g of propylene glycol (hereinafter abbreviated as "PG"), and 0.131 g of tetraisopropoxytitanium (hereinafter abbreviated as "TiPT") were put into a 3 L four-necked flask equipped with a thermometer, a stirrer, a nitrogen introducing tube, and a rectification column, and then the temperature was raised to 220° C. and a dehydration esterification reaction was carried out while removing generated water. When the acid value of the reaction product reached 1 or less, the reaction product was filtered and taken out to obtain a transparent yellow liquid polyester polyol (A1). The number average molecular weight (Mn) of the polyester polyol (A1) was 790, the weight average molecular weight (Mw) was 1,300, the (Mw)/(Mn) was 1.6, the acid value was 0.5, and the hydroxyl value was 163. Here, the acid value was measured according to JIS K 0070-1992, and the hydroxyl value was measured according to JIS K 0070-1992 (the same applies below).

Synthesis Example 2 (Same as Above)

1,111 g of PA, 365 g of AA, 987 g of PG, and 0.148 g of TiPT were put into a 3 L four-necked flask equipped with a thermometer, a stirrer, a nitrogen introducing tube, and a rectification column, and then the temperature was raised to 220° C. and a dehydration esterification reaction was carried out while removing generated water. When the acid value of the reaction product reached 1 or less, the reaction product was filtered and taken out to obtain a transparent yellow liquid polyester polyol (A2). The number average molecular weight (Mn) of the polyester polyol (A2) was 920, the weight average molecular weight (Mw) was 1,770, the (Mw)/(Mn) was 1.9, the acid value was 0.6, and the hydroxyl value was 119.

Synthesis Example 3 (Same as Above)

365 g of AA, 1,111 g of PA, 943 g of PG, and 0.145 g of TiPT were put into a 3 L four-necked flask equipped with a thermometer, a stirrer, a nitrogen introducing tube, and a rectification column, and then the temperature was raised to 220° C. and a dehydration esterification reaction was carried out while removing generated water. When the acid value of the reaction product reached 1 or less, the reaction product was filtered and taken out to obtain a transparent yellow liquid polyester polyol (A3). The number average molecular weight (Mn) of the polyester polyol (A3) was 1130, the weight average molecular weight (Mw) was 2,270, the (Mw)/(Mn) was 2.0, the acid value was 0.7, and the hydroxyl value was 82.

Synthesis Example 4 (Same as Above)

1,259 g of PA, 923 g of PG, and 0.131 g of TiPT were put into a 3 L four-necked flask equipped with a thermometer, a stirrer, a nitrogen introducing tube, and a rectification column, and then the temperature was raised to 220° C. and a dehydration esterification reaction was carried out while removing generated water. When the acid value of the reaction product reached 1 or less, the reaction product was filtered and taken out to obtain a transparent yellow liquid polyester polyol (A4). The number average molecular weight (Mn) of the polyester polyol (A4) was 780, the weight average molecular weight (Mw) was 1,290, the (Mw)/(Mn) was 1.6, the acid value was 0.6, and the hydroxyl value was 166.

Synthesis Example 5 (Same as Above)

310 g of AA, 944 g of PA, 733 g of ethylene glycol (hereinafter abbreviated as "EG"), and 0.119 g of TiPT were put into a 3 L four-necked flask equipped with a thermometer, a stirrer, a nitrogen introducing tube, and a rectification column, and then the temperature was raised to 220° C. and a dehydration esterification reaction was carried out while removing generated water. When the acid value of the reaction product reached 1 or less, the reaction product was filtered and taken out to obtain a transparent yellow liquid polyester polyol (A5). The number average molecular weight (Mn) of the polyester polyol (A5) was 770, the weight average molecular weight (Mw) was 1,250, the (Mw)/(Mn) was 1.6, the acid value was 0.5, and the hydroxyl value was 169.

Synthesis Example 6 (Same as Above)

310 g of AA, 944 g of PA, 455 g of PG, 371 g of EG, and 0.125 g of TiPT were put into a 3 L four-necked flask equipped with a thermometer, a stirrer, a nitrogen introducing tube, and a rectification column, and then the temperature was raised to 220° C. and a dehydration esterification reaction was carried out while removing generated water. When the acid value of the reaction product reached 1 or less, the reaction product was filtered and taken out to obtain a transparent yellow liquid polyester polyol (A6). The number average molecular weight (Mn) of the polyester polyol (A6) was 780, the weight average molecular weight (Mw) was 1,270, the (Mw)/(Mn) was 1.6, the acid value was 0.4, and the hydroxyl value was 167.

Synthesis Example 7 (Same as Above)

251 g of succinic acid (hereinafter abbreviated as "SucA"), 944 g of PA, 913 g of PG, and 0.127 g of TiPT were put into a 3 L four-necked flask equipped with a thermometer, a stirrer, a nitrogen introducing tube, and a rectification column, and then the temperature was raised to 220° C. and a dehydration esterification reaction was carried out while removing generated water. When the acid value of the reaction product reached 1 or less, the reaction product was filtered and taken out to obtain a transparent yellow liquid polyester polyol (A7). The number average molecular weight (Mn) of the polyester polyol (A7) was 790, the weight average molecular weight (Mw) was 1,290, the (Mw)/(Mn) was 1.6, the acid value was 0.3, and the hydroxyl value was 164.

Synthesis Example 8 [Synthesis of Diester (B)]

1,906 g of para-toluic acid (hereinafter abbreviated as "pTA"), 639 g of PG, and 0.153 g of TiPT were put into a 3 L four-necked flask equipped with a thermometer, a stirrer, a nitrogen introducing tube, and a rectification column, and then the temperature was raised to 220° C. and reacted for 11 hours. After the reaction, unreacted PG was evaporated and removed under reduced pressure at 200° C. Thereafter, the reduced pressure was released and the temperature was lowered, and the reaction product was filtered and taken out to obtain a transparent yellow liquid diester (B1). The number average molecular weight (Mn) of the diester (B1) was 310, the weight average molecular weight (Mw) was 320, the (Mw)/(Mn) was 1.0, the acid value was 0.1, and the hydroxyl value was 4.

Synthesis Example 9 (Same as Above)

1709 g of benzoic acid (hereinafter abbreviated as "BzA"), 639 g of PG, and 0.141 g of TiPT were put into a 3 L four-necked flask equipped with a thermometer, a stirrer, a nitrogen introducing tube, and a rectification column, and then the mixture was heated to 220° C. and reacted for 11 hours. After the reaction, unreacted 1,2-propylene glycol was evaporated and removed under reduced pressure at 200° C. After the outflow of unreacted alcohol stopped, the reduced pressure was released and the temperature was lowered, and the reaction product was filtered and taken out to obtain a transparent yellow liquid diester (B2). The number average molecular weight (Mn) of the diester (B2) was 300, the weight average molecular weight (Mw) was 310, the (Mw)/(Mn) was 1.0, the acid value was 0.2, and the hydroxyl value was 5.

Synthesis Example 10 [Synthesis of Polyester (A') for Comparison]

592 g of PA, 694 g of PG, 1,089 g of pTA, and 0.14 g of TiPT were put into a 3 L four-necked flask equipped with a thermometer, a stirrer, a nitrogen introducing tube, and a rectification column, and then the temperature was raised to 220° C. and a dehydration esterification reaction was carried out while removing generated water. When the acid value of the reaction product became 1 or less, the reaction product was filtered and taken out to obtain a transparent yellow liquid polyester (A'1) for comparison. The number average molecular weight (Mn) of the polyester (A'1) for comparison was 430, the weight average molecular weight (Mw) was 550, the (Mw)/(Mn) was 1.3, the acid value was 0.5, and the hydroxyl value was 10.

Synthesis Example 11 [Synthesis of Diester (B') for Comparison]

1221 g of BzA, 841 g of 2-butyl-2-ethylpropanediol (hereinafter abbreviated as "BEPD"), and 0.124 g of TiPT were put into a 3 L four-necked flask equipped with a thermometer, a stirrer, a nitrogen introducing tube, and a rectification column, and then the mixture was heated to 220° C. and reacted for 11 hours. After the reaction, unreacted BEPD was evaporated and removed under reduced pressure at 200° C. Thereafter, the reduced pressure was released and the temperature was lowered, and the reaction product was filtered and taken out to obtain a transparent yellow liquid diester (B'1) for comparison. The number average molecular weight (Mn) of the diester (B'1) for comparison was 310, the weight average molecular weight (Mw) was 320, the (Mw)/(Mn) was 1.0, the acid value was 0.1, and the hydroxyl value was 4.

Example 1

60 parts of the polyester polyol (A1) and 40 parts of the diester (B1) were mixed to obtain a cellulosic ester resin modifier (1) of the present invention. The obtained cellulosic ester resin modifier (1) was evaluated for volatility in a heated environment in accordance with the following description. The evaluation results are shown in Table 1.

<Method for Evaluating Volatility Under Heated Environment>

Approximately 10.0 g of the cellulosic ester resin modifier (1) was put into an aluminum cup (upper portion diameter: 80 mm, lower portion diameter: 57 mm, height: 57 mm), and the total mass of the aluminum cup and the cellulosic ester resin modifier (1) was measured with an electronic balance. The aluminum cup containing the cellulosic ester resin modifier (1) was left standing in an oven (140° C.). After 2 hours, the cellulosic ester resin modifier (1) was taken out, cooled to room temperature in a desiccator, then the total mass of the aluminum cup and the cellulosic ester resin modifier (1) was measured with an electronic balance, and the difference (mass difference) between the total mass of the aluminum cup and the cellulosic ester resin modifier (1) before being left standing in the oven and the total mass of the aluminum cup and the cellulosic ester resin modifier (1) after being left standing in the oven was determined. The mass difference based on the total mass of the aluminum cup and the cellulosic ester resin modifier (1) before being left standing in the oven was determined in terms of 100 percent fraction (%) (heating reduction amount (%)). The smaller this value is, the more stable the cellulosic ester resin modifier (1) is in a heated environment, the smaller the amount of volatile components produced by heating is, and the less likely the modifier is to contaminate the production line at the time of producing the cellulosic ester film.

10 parts of the obtained cellulosic ester resin modifier (1) and 100 parts of triacetyl cellulose ("LT-35" manufactured by Daicel Corporation, degree of acetylation of 61%) were added to and dissolved in a mixed solution of 810 parts of methylene chloride and 90 parts of methanol to thereby prepare a dope solution.

The dope solution described above was cast on a glass substrate to a thickness of approximately 0.8 mm, and the aluminum vat was covered from above and left to stand overnight. Thereafter, the formed film was peeled off from the glass substrate and further dried by gradually raising the temperature from 50° C. for 30 minutes to 120° C. for 30 minutes to obtain a cellulosic ester film having a width of approximately 180 mm and a length of approximately 250 mm. The thickness of the obtained film was approximately 60 μm. Using this film, evaluation of compatibility between cellulosic ester resin modifier and cellulosic ester resin, evaluation of water vapor permeability of the film, and evaluation of the durability of the film in high-humidity and high-temperature environments were performed according to the following method. The evaluation results are shown in Table 1.

<Method for Evaluating Compatibility of Cellulosic Ester Resin Modifier and Cellulosic ester Resin>

The prepared film was pinched between metal clips and left in a hanging state for 5 days in a constant temperature and constant humidity at a temperature of 85° C. and a relative humidity of 90% RH, and thereafter, using a turbidimeter ("NDH 5000" manufactured by Nippon Denshoku Industries Co., Ltd.), the HAZE value of the film was measured in accordance with JIS K 7105 and the transparency of the whole film was visually evaluated. Evaluations with a HAZE of 1 or less and where the whole film was transparent are denoted as "A", and evaluations with a HAZE exceeding 1 and evaluations where a HAZE was 1 or less but where white turbidity was partially observed are denoted as "B". Here, for additives having poor compatibility, white turbidity was confirmed particularly in the portion pinched by the metal clips.

<Method for Evaluating Water Vapor Permeability of Film>

A circular piece having a diameter of 70 mm was cut out from a cellulosic ester film having the width of approximately 180 mm and the length of approximately 250 mm. Using this circular piece, a test was conducted under the condition of 40° C.×90% RH with a method in accordance with JIS Z 0208 to calculate a conversion value over 24 hours, and this value was set as an evaluation value (unit: $g/m^2$ 24 hrs). The smaller this value is, the more excellent the water vapor permeability resistance of the film is.

<Method for Evaluating Durability of Film in High-Temperature and High-Humidity Environments>

This evaluation was carried out by evaluating the hydrolyzability of the film. Specifically, first, a belt-shaped film having a width of 40 mm was cut out from a cellulosic ester film having the width of approximately 180 mm and the length of approximately 250 mm. The 40 mm width of this film was set as the longitudinal width, and notches with a length of 2 cm were inserted at intervals of 1 cm in width from the upper side of the lateral width as a starting point toward the lower side. Thereafter, notches having a length of 2 cm were formed at intervals of 1 cm in width from the lower side of the lateral width as a starting point toward the upper side to prepare a test piece. The notches from the lower side as a starting point to the upper side were formed in a staggered manner with the notches from the upper side as a starting point toward the lower side. 1 g of this test piece was rolled into a spiral shape and put into a glass bottle having a height of 5 cm and a volume of 30 ml. The glass bottle was allowed to stand overnight in an environment of 85° C.×90% RH, then capped and left to stand in an environment of 85° C.×90% RH for 1,000 hours. After being left to stand, the lid of the glass bottle was opened, and the presence or absence of an acetic acid odor was confirmed. Evaluation with no acetic acid odor at all or a slight odor is denoted as "A" and evaluation with a clear acetic acid odor is denoted as "B".

In addition, a cellulosic ester film was prepared separately from the above with the following method and the dimensional stability of the film against heat was evaluated.

<Method for Preparing Film>

The dope solution was cast on a glass substrate with a thickness of approximately 0.8 mm and dried by gradually increasing the temperature from 40° C. for 30 minutes to 120° C. for 30 minutes without peeling from the glass substrate to obtain a cellulosic ester film with a width of approximately 180 mm and a length of approximately 250 mm. The thickness of the obtained film was approximately 60 μm.

<Method for Evaluating Dimensional Stability Against Heat>

A 40 mm square test piece was punched out from the film and each dimension of the test piece was accurately measured using a CNC image measuring apparatus manufactured by Nikon Corporation in an environment of 25° C. and 55% RH. The test piece was left to stand upright on a glass plate in an environment of 90° C. for 24 hours, and then the dimensions were measured again in an environment of 25° C. and 55% RH. The difference between the dimensions of the film before being left to stand for 24 hours in an environment of 90° C. and the dimensions of the film after being left to stand for 24 hours in an environment of 90° C. with respect to the dimensions of the film before being left to stand for 24 hours in an environment of 90° C. was determined as a 100 percent fraction (%) [{(the difference between the dimensions of the film before being left to stand for 24 hours in an environment of 90° C. and the dimensions of the film after being left to stand for 24 hours in an environment of 90° C.)/(the dimensions of the film before being left to stand for 24 hours in an environment of 90° C.)}×100]. The smaller this value is, the more excellent the dimensional stability of the film is. The value of this 100 percent fraction (%) is the average value of each 100 percent fraction (%) at each side.

Examples 2 to 10

Cellulosic ester resin modifiers (2) to (10) were obtained in the same manner as in Example 1 except that the polyester polyol (A) and the diester (B) were used in the blends shown in Table 1. The same evaluation as in Example 1 was carried out, and the results are shown in Table 1.

TABLE 1

| | | Examples | | | | | | | | | |
|---|---|---|---|---|---|---|---|---|---|---|---|
| | | 1 (1) | 2 (2) | 3 (3) | 4 (4) | 5 (5) | 6 (6) | 7 (7) | 8 (8) | 9 (9) | 10 (10) |
| | Cellulosic ester resin modifier | | | | | | | | | | |
| Constituent components | Polyester polyol (A1) | 60 | 70 | 80 | 70 | | | | | | |
| | Polyester polyol (A2) | | | | | 70 | | | | | |
| | Polyester polyol (A3) | | | | | | 70 | | | | |
| | Polyester polyol (A4) | | | | | | | 70 | | | |
| | Polyester polyol (A5) | | | | | | | | 70 | | |
| | Polyester polyol (A6) | | | | | | | | | 70 | |
| | Polyester polyol (A7) | | | | | | | | | | 70 |
| | Diester (B1) | 40 | 30 | 20 | | 30 | 30 | 30 | 30 | 30 | 30 |
| | Diester (B2) | | | | 30 | | | | | | |
| | Heating reduction amount (%) | 2.3 | 2.6 | 2.6 | 2.7 | 2.5 | 2.5 | 2.7 | 2.8 | 2.7 | 2.7 |
| Film | Compatibility | A | A | A | A | A | A | A | A | A | A |

TABLE 1-continued

|  | | Examples | | | | | | | | | |
|---|---|---|---|---|---|---|---|---|---|---|---|
|  | Cellulosic ester resin modifier | 1 (1) | 2 (2) | 3 (3) | 4 (4) | 5 (5) | 6 (6) | 7 (7) | 8 (8) | 9 (9) | 10 (10) |
| performances | Dimensional stability against heat (%) | 0.28 | 0.25 | 0.26 | 0.26 | 0.26 | 0.26 | 0.26 | 0.26 | 0.26 | 0.26 |
|  | Water Vapor Permeability (g/m²/ 24 hrs) | 565 | 560 | 570 | 550 | 565 | 560 | 565 | 560 | 565 | 560 |
|  | Hydrolyzability | A | A | A | A | A | A | A | A | A | A |

Comparative Examples 1 to 5

Cellulosic ester resin modifiers (1') to (5') for comparison were obtained in the same manner as in Example 1 except that a polyester (A') and a diester (B') were used in the blends shown in Table 2. The same evaluation as in Example 1 was carried out, and the results are shown in Table 2.

TABLE 2

|  |  | Examples | | | | |
|---|---|---|---|---|---|---|
|  | Cellulosic ester resin modifier | 1 (1') | 2 (2') | 3 (3') | 4 (4') | 5 (5') |
| Constituent components | Polyester polyol (A1) |  |  |  | 100 | 70 |
|  | Polyester (A'1) |  |  | 100 |  |  |
|  | Diester (B'1) |  |  |  |  | 30 |
|  | TPP |  | 100 |  |  |  |
|  | Heating reduction amount (%) | — | 0.93 | 3 | 2.8 | 2.6 |
| Film performances | Compatibility | — | A | B | A | A |
|  | Dimensional stability against heat (%) | 0.29 | 0.2 | 0.29 | 0.3 | 0.29 |
|  | Water Vapor Permeability (g/m²/24 hrs) | 1150 | 740 | 570 | 605 | 605 |
|  | Hydrolyzability | B | B | A | B | A |

Footnotes in Table 1 and Table 2
Hydrolyzability: Evaluation of durability of film in high-temperature and high-humidity environments
TPP: triphenyl phosphate

The invention claimed is:

1. A cellulosic ester resin modifier comprising:
a polyester polyol (A), which has a phthalic acid residue and an aliphatic glycol residue having 2 to 3 carbon atoms in a main chain skeleton; and
a diester (B), which has an aliphatic glycol having 2 to 3 carbon atoms and an aromatic monocarboxylic acid,
wherein a mass ratio of [(A)/(B)] is in a range of 90/10 to 60/40.

2. The cellulosic ester resin modifier according to claim 1, wherein the polyester polyol (A) and the diester (B) are contained in a mass ratio [(A)/(B)] of 80/20 to 65/35.

3. A cellulosic ester resin composition comprising:
the cellulosic ester resin modifier according to claim 2; and
a cellulosic ester resin,
wherein the cellulosic ester resin modifier is included in an amount of 5 to 30 parts by mass with respect to 100 parts by mass of the cellulosic ester resin.

4. An optical film comprising:
the cellulosic ester resin composition according to claim 3.

5. The cellulosic ester resin modifier according to claim 1, wherein an aliphatic glycol residue having 2 to 3 carbon atoms in a main chain skeleton of the polyester polyol (A) is an ethylene glycol residue, or a propylene glycol residue.

6. A cellulosic ester resin composition comprising:
the cellulosic ester resin modifier according to claim 5; and
a cellulosic ester resin,
wherein the cellulosic ester resin modifier is included in an amount of 5 to 30 parts by mass with respect to 100 parts by mass of the cellulosic ester resin.

7. An optical film comprising:
the cellulosic ester resin composition according to claim 6.

8. The cellulosic ester resin modifier according to claim 1, wherein the polyester polyol (A) further has an aliphatic dicarboxylic acid residue having 2 to 4 carbon atoms in the main chain skeleton.

9. A cellulosic ester resin composition comprising:
the cellulosic ester resin modifier according to claim 8; and
a cellulosic ester resin,
wherein the cellulosic ester resin modifier is included in an amount of 5 to 30 parts by mass with respect to 100 parts by mass of the cellulosic ester resin.

10. An optical film comprising:
the cellulosic ester resin composition according to claim 9.

11. The cellulosic ester resin modifier according to claim 8, wherein the aliphatic dicarboxylic acid residue having 2 to 4 carbon atoms is an adipic acid residue or a succinic acid residue.

12. A cellulosic ester resin composition comprising:
the cellulosic ester resin modifier according to claim 11; and
a cellulosic ester resin,
wherein the cellulosic ester resin modifier is included in an amount of 5 to 30 parts by mass with respect to 100 parts by mass of the cellulosic ester resin.

13. An optical film comprising:
the cellulosic ester resin composition according to claim 12.

14. The cellulosic ester resin modifier according to claim 1,
wherein the diester (B) is a diester of ethylene glycol or propylene glycol with benzoic acid or para-toluic acid.

15. A cellulosic ester resin composition comprising:
the cellulosic ester resin modifier according to claim 14; and
a cellulosic ester resin,
wherein the cellulosic ester resin modifier is included in an amount of 5 to 30 parts by mass with respect to 100 parts by mass of the cellulosic ester resin.

16. An optical film comprising:
the cellulosic ester resin composition according to claim 15.

17. A cellulosic ester resin composition comprising:
the cellulosic ester resin modifier according to claim 1; and
a cellulosic ester resin,
wherein the cellulosic ester resin modifier is included in an amount of 5 to 30 parts by mass with respect to 100 parts by mass of the cellulosic ester resin.

18. An optical film comprising:
the cellulosic ester resin composition according to claim 17.

* * * * *